T. E. MURRAY, Jr., AND J. B. MURRAY.
METHOD OF ELECTRICAL WELDING.
APPLICATION FILED MAY 21, 1919.

1,329,136. Patented Jan. 27, 1920.

Thomas E. Murray Jr.
Joseph B. Murray
Inventors

By their Attorney

UNITED STATES PATENT OFFICE.

THOMAS E. MURRAY, JR., AND JOSEPH B. MURRAY, OF BROOKLYN, NEW YORK.

METHOD OF ELECTRICAL WELDING.

1,329,136.  Specification of Letters Patent.  Patented Jan. 27, 1920.

Application filed May 21, 1919. Serial No. 298,749.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Electrical Welding, of which the following is a specification.

Two bodies to be electrically welded are commonly held in electrodes which are moved relatively to one another during the passage of the welding current. The portions of the bodies which protrude into the space between the electrodes are thus rendered plastic by the current and are also compressed and extruded. It is often desirable that the take-up of metal due to this compression should be definitely predetermined, because in such case, for example, the electrodes themselves need not come into contact at the end of the operation, and so be liable to burning. Again, it may be important that the reduced dimension of the bodies pressed together and in the direction of the pressure after the weld is completed should be some precise figure.

Our invention is a method of electrical welding, whereby these results are secured.

In the accompanying drawings—

Figure 1:
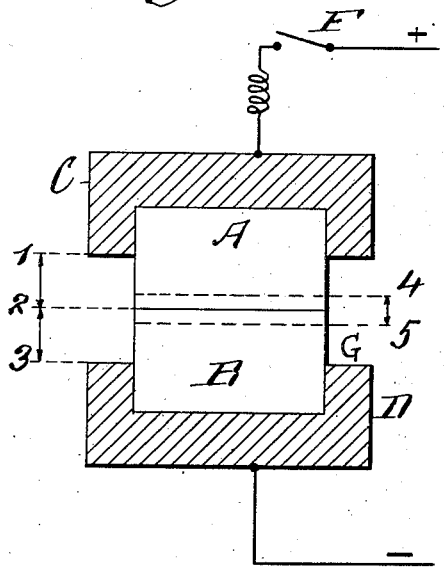
Figure 2:
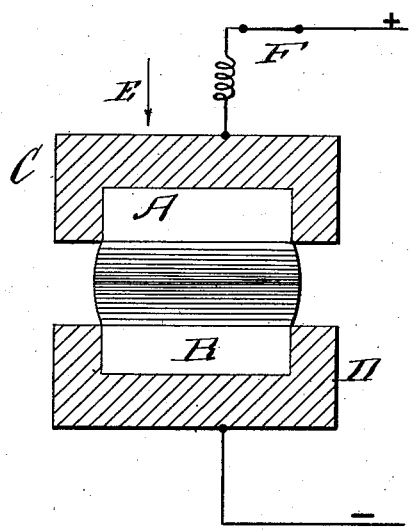
Figure 3:
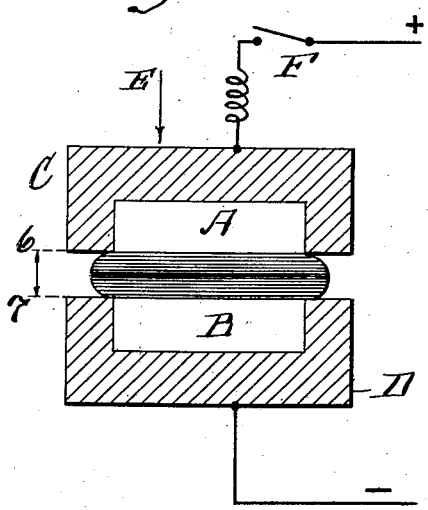
Figure 4:
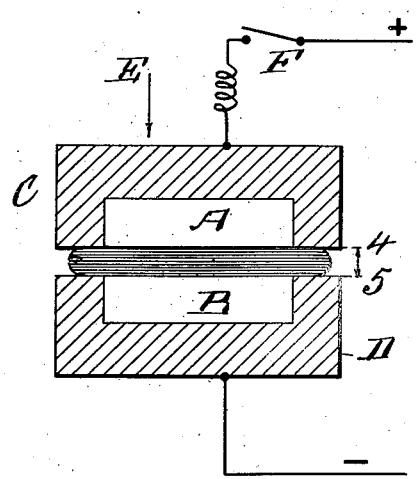

Figure 1 shows two bodies disposed in registering contact in welding electrodes before the welding current is established. Fig. 2 shows said bodies after one of said electrodes has been moved toward the other electrode, the welding current having been established. Fig. 3 shows said bodies after said electrode has been moved still farther toward the other electrode when the welding current is cut off. Fig. 4 shows said bodies after the said electrode has been still farther moved to a predetermined final distance from the other electrode.

Similar letters of reference indicate like parts.

A and B are bodies to be electrically welded, the said bodies being placed in registering contact, as shown in Fig. 1, in suitable electrodes C, D. The upper electrode C is to be movable toward the lower electrode D, as indicated by the large arrows E, by any suitable means—not shown. Any suitable device, such as switch F, is interposed in the lead of the welding circuit for interrupting the current. The bodies A, B protrude beyond the opposing faces of the electrodes, and, therefore, into the space G between them for a predetermined distance 1, 2—2, 3, said distances here being shown as equal, so that their sum, or the distance 1, 3, when the bodies are in registering contact as shown in Fig. 1, is the distance between the said opposing faces. In order to illustrate our method, we will assume that, after the weld is completed, the distance 1, 3 is to be reduced to the distance 4, 5, represented by the interval between the dotted lines on Fig. 1; or in other words, that by reason of the heating of the portions of the bodies A, B which initially protrude into the space G between the electrodes, and also by reason of the pressure imposed upon the same while thus rendered plastic, the metal will be compressed and extruded, so that the distance between electrodes C, D will become reduced from 1, 3 to 4, 5. To put it another way, the take-up of the metal will be represented by the difference between said distances.

The conditions being as shown in Fig. 1, the switch F is closed to establish the welding current across the joint between bodies A, B, and the upper electrode C is moved downwardly, compressing and extruding the plastic metal between the electrodes, as shown in Fig. 2. This is continued until the distance between the electrodes has become reduced to a predetermined limit—for example, the distance 6, 7 in Fig. 3. The switch F is then opened, as shown, to cut off the current, but the downward movement of electrode C is continued, thus subjecting the metal between the electrodes to still further pressure and extrusion, and finally reducing the distance between said electrodes to the limiting distance 4, 5, as predetermined.

We have found by actual experiment under practical conditions that during the welding operation the amount of current required does not remain at a constant ratio to the pressure exerted upon the plastic mass, but, on the contrary, said ratio increases very rapidly toward the end of the operation. But at that time, the metal is already highly heated and the current is not necessary to keep it sufficiently plastic to enable the pressing electrode alone to complete the work. Hence we find a material saving in the cost of the current when it is cut off, as hereinbefore described.

It will further be obvious that even if the electrodes C, D should finally come into contact at the end of the operation, the previous cutting off of the current will prevent any short-circuiting through them and consequent injury.

We claim:

1. The method of electrical welding, which consists in subjecting the bodies to be united first to both the heating effect of the current and to pressure at the joint, and then interrupting said current and subjecting the heated metal to pressure only until a predetermined take-up of said metal at the joint is attained.

2. The method of electrical welding, which consists in subjecting the bodies to be united to the current and to pressure between welding electrodes until a predetermined distance between the said electrodes is established, then interrupting said current and continuing said pressure until a certain other predetermined limiting distance between said electrodes is attained.

In testimony whereof we have affixed our signatures in presence of two witnesses.

THOMAS E. MURRAY, Jr.
JOSEPH B. MURRAY.

Witnesses:
GERTRUDE T. PORTER,
MAY T. McGARRY.